Dec. 15, 1925.
J. F. CRAIG
1,565,421
AUTOMATIC CLUTCH CONTROL
Filed Dec. 7, 1923
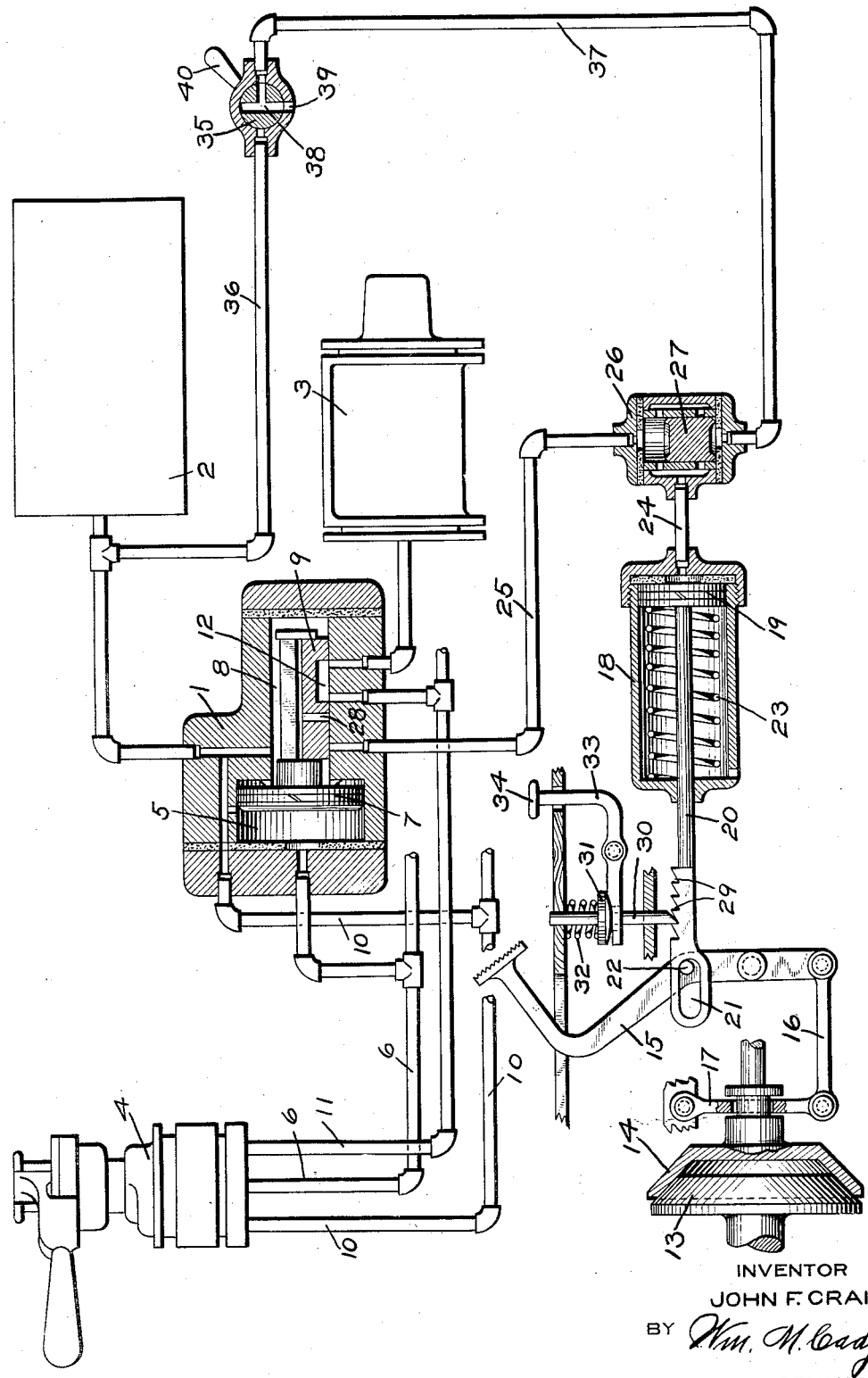
INVENTOR
JOHN F. CRAIG
BY Wm. M. Cady
ATTORNEY Patented Dec. 15, 1925.

1,565,421

UNITED STATES PATENT OFFICE.

JOHN F. CRAIG, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

AUTOMATIC CLUTCH CONTROL.

Application filed December 7, 1923. Serial No. 679,233.

*To all whom it may concern:*

Be it known that I, JOHN F. CRAIG, a citizen of the United States, residing at Edgewood, in the county of Allegheny and State of Pennsylvania, have invented new and useful Improvements in Automatic Clutch Controls, of which the following is a specification.

This invention relates to gasoline motor driven cars, and more particularly to a clutch controlling mechanism.

Where a gasoline motor driven car is provided with fluid pressure brakes, it is desirable that the clutch be thrown out when the brakes are applied, particularly if applied hard as in an emergency application of the brakes.

The principal object of my invention is to provide automatic means operable upon applying the brakes for releasing the motor clutch.

In the accompanying drawing, the single figure is a diagrammatic view, with certain parts of the apparatus in section, of a fluid pressure brake and clutch controlling mechanism for a gasoline motor driven car, and showing my invention applied thereto.

The fluid pressure brake mechanism may comprise an emergency valve device 1, a reservoir 2, charged with fluid under pressure, a brake cylinder 3, and a brake valve device 4. The emergency valve device 1 may comprise a casing having a piston chamber 5 connected to the usual emergency brake pipe 6 and containing piston 7 and having a valve chamber 8, connected to reservoir 2, and containing a slide valve 9, adapted to be operated by piston 7.

The brake pipe 6 is connected to the brake valve 4, as well as a reservoir pipe 10 and a straight air pipe 11, the straight air pipe being connected in the normal release position of the slide valve 9, through cavity 12 with brake cylinder 3.

The clutch mechanism is merely shown diagrammatically as clutch members 13 and 14 and a pedal lever 15, connected through a link 16 with lever 17, the movement of which is adapted to operate the clutch member 14.

According to my invention, a fluid pressure cylinder 18 is provided, containing a piston 19 having a piston stem 20. The outer extended end of the stem 20 is provided with a longitudinal slot 21 in which a pin 22, carried by the pedal lever 15, is adapted to engage. The piston 19 is subject on one side to the pressure of a release spring 23 and a pipe 24 is connected to the opposite side.

Interposed between pipe 24 and a pipe 25, opening at the seat of slide valve 9 is a double check valve device 26 containing a double check valve 27.

In operation, the brakes may be operated in the usual manner, that is to say, when the brake valve 4 is moved to service position, fluid under pressure is supplied through the straight air pipe 11 and cavity 12 to the brake cylinder 3, to effect a service application of the brakes. When the brake valve is turned to emergency position, fluid is vented from the emergency brake pipe 6 and piston 7 is then shifted to emergency position in which the slide valve 9 moves to establish communication from valve chamber 8 to the brake cylinder 3, so as to effect an emergency application of the brakes. When in emergency position, a port 28 in slide valve 9 establishes communication from valve chamber 8 to pipe 25, so that fluid under pressure is supplied to said pipe and flows past the double check valve 27 to the cylinder 18. The piston 19 is then forced out, causing the pedal lever 15 to be moved to the left by engagement of pin 22 with the rear end of slot 21. The clutch member 14 is thus disengaged from the clutch member 13 by this movement, so that the clutch is released when an emergency application of the brakes is made.

In order to ensure that the transmission will first be put into low gear and ensure against starting the motor, which would probably occur were the clutch thrown in with the car at low speed and the transmission in high gear, I provide a locking mechanism for locking the clutch mechanism when moved to release position. For this purpose, the rod 20 may be provided with notches 29, engageable by a spring pressed pawl 30.

A collar 31 is secured to the pawl 30, a spring 32 engaging one side of said collar and a pivotally mounted pedal lever 33 engaging the other side of the collar. It will be evident that when the rod 20 is pushed out to effect the release of the clutch, the pawl 30 will engage a corresponding notch in the rod and lock the rod against a return movement. In order to again throw the clutch in, it is necessary for the operator to depress the lever 33 by stepping on the button 34, whereby the lever 33 is operated to lift the pawl 30 out of locking engagement with the rod 20. The piston 19 and said rod will then be returned to normal position by spring 23, permitting the clutch members 13 and 14 to reengage in the usual manner.

In some instances, such as on gasoline motor driven rail cars, a brake valve for controlling the brakes may be provided at the rear end of the vehicle, so as to permit a man stationed at the rear to control the car in backing up.

For the purpose of enabling a man, stationed at the rear end of a car of the above type, to throw out the clutch when he applies the brake, I provide a three way cock 35 at the rear end of the vehicle. Connected to the cock is a fluid pressure supply pipe 36 leading to the reservoir 2 and a pipe 37 connects the cock with one side of the double check valve 27. Normally, the cock 35 is in the position shown in the drawing, with a three way port 38 therein connecting pipe 37 with an exhaust port 39. With the cock in this position, the under side of the double check valve 27 is open to the atmosphere, and the double check valve therefore remains in the position shown.

If the man at the rear desires to throw out the clutch, he turns the cock 35 by means of the handle 40 so that the three way port 38 connects pipe 36 with pipe 37. Fluid under pressure is then supplied to pipe 37 and the double check valve 27 is shifted by the pressure in pipe 37 to its upper position, in which communication is opened from pipe 37 to pipe 24. The piston 19 is then forced outwardly so as to throw out the clutch, as hereinbefore described.

Having now described my invention, what I claim as new and desire to secure by Letters Patent, is:

1. In a gasoline motor driven vehicle, the combination with a motor clutch, of a valve device for supplying fluid under pressure to effect an application of the brakes on the vehicle, a manually operable valve means for controlling the operation of said valve device, and fluid pressure operated means operatively connected to said clutch and operated by fluid supplied in the application position of said valve device for releasing said clutch.

2. In a gasoline motor driven vehicle, the combination with a motor clutch, of an emergency valve device operated upon a sudden reduction in fluid pressure for supplying fluid to effect an emergency application of the brakes on the vehicle, a cylinder containing a piston operated by fluid under pressure for actuating said clutch, and means for supplying fluid under pressure to said piston in the emergency position of said valve device.

3. In a gasoline motor driven vehicle, the combination with a motor clutch, of a fluid pressure brake on the vehicle, a cylinder containing a piston operated by fluid under pressure supplied in applying the fluid pressure brakes for operating said clutch, means for locking said piston against return movement, and manually controlled means for releasing said locking means.

4. In a gasoline motor driven vehicle, the combination with a motor clutch, of a fluid pressure brake on the vehicle, a cylinder containing a piston operated by fluid under pressure supplied in applying the fluid pressure brakes for operating said clutch, and a manually operable valve for also supplying fluid to operate said piston.

5. In a gasoline motor driven vehicle, the combination with a motor clutch, of a fluid pressure brake including a valve device for supplying fluid to effect an application of the brakes on the vehicle, fluid pressure operated means operated by fluid under pressure supplied upon movement of said valve device to application position for operating said clutch, a manually operable valve for also supplying fluid to operate said fluid pressure operated means, and a double check valve for controlling communication from said valve device and said manually operable valve to said fluid pressure operated means.

In testimony whereof I have hereunto set my hand.

JOHN F. CRAIG.